(12) United States Patent
Krishnaprasad et al.

(10) Patent No.: US 7,051,042 B2
(45) Date of Patent: May 23, 2006

(54) TECHNIQUES FOR TRANSFERRING A SERIALIZED IMAGE OF XML DATA

(75) Inventors: Muralidhar Krishnaprasad, Fremont, CA (US); Ravi Murthy, Fremont, CA (US); Anand Manikutty, Foster City, CA (US); James Warner, Sunnyvale, CA (US); Neema Jalali, Belmont, CA (US); Sivasankaran Chandrasekar, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 317 days.

(21) Appl. No.: 10/428,393

(22) Filed: May 1, 2003

(65) Prior Publication Data

US 2004/0220946 A1 Nov. 4, 2004

(51) Int. Cl.
*G06F 17/30* (2006.01)
(52) U.S. Cl. .................................................... 707/102
(58) Field of Classification Search ................ 707/102, 707/1–10, 100–101, 103–104.1; 715/514; 709/246
See application file for complete search history.

(56) References Cited

U.S. PATENT DOCUMENTS

| | | | |
|---|---|---|---|
| 6,269,380 B1 | 7/2001 | Terry et al. | |
| 6,279,006 B1 | 8/2001 | Shigemi et al. | |
| 6,675,230 B1 | 1/2004 | Lewallen | |
| 6,826,568 B1 | 11/2004 | Bernstein et al. | |
| 2003/0065659 A1 | 4/2003 | Agarwal et al. | |
| 2003/0140308 A1 | 7/2003 | Murthy et al. | |
| 2003/0167277 A1* | 9/2003 | Hejlsberg et al. | 707/102 |
| 2003/0226111 A1* | 12/2003 | Wirts et al. | 715/514 |
| 2004/0177080 A1* | 9/2004 | Doise et al. | 707/100 |
| 2004/0255046 A1* | 12/2004 | Ringseth et al. | 709/246 |

OTHER PUBLICATIONS

Josephine Cheng, et al., "IBM DB2 XML Extender, An end-to-end solution for storing and retrieving XML documents," IEEE, ICDE '00 Conference, San Diego, Feb. 2000, 128 pages.

Jim Melton, "ISO-ANSI Working Draft, XML-Related Specifications (SQL/XML)," WG3: DRS-020, H2-2002-365, Aug. 2002, 154 pages.

(Continued)

*Primary Examiner*—Diane Mizrahi
(74) *Attorney, Agent, or Firm*—Hickman Palermo Truong & Becker, LLP

(57) ABSTRACT

Techniques for transferring a serialized image of data for an XML construct includes selecting a first format from multiple different XML serialization formats that represent, in a database system, data for XML constructs as a series of data units, such as a series of bytes representing characters, or a series of bits, bytes or octets representing binary values. A message is generated that includes a payload and a payload type field. The payload includes particular serialized data that represents particular data for a particular XML construct in the first format. The type field includes data that indicates the first format. The message is sent from a sending component of the database system to a different receiving component of the database system. These techniques allow the format selection to be based on characteristics of the sending or receiving components to make better use of the resources available to the two components.

33 Claims, 7 Drawing Sheets

OTHER PUBLICATIONS

Oracle Corporation, "Oracle9i XML Database Developer's Guide—Oracle XML DB," Release 2 (9.2), Mar. 2002, Part No. A96620-1, pp. 5-8-5-10, 5-21-5-24 and 5-32-5-52.

W3C, "XML Schema Part 1: Structures," W3C Recommendation, May 2, 2001, http://www.w3.org/TR/2001/REC-xmlschema-1-20010502/, pp. 1-203 (text provided on CD-ROM).

W3C, "XML Schema Part 2: Datatypes," W3C Recommendation, May 2, 2001, http://www.w3.org/TR/2001/REC-xmlschema-2-20010502/, pp. 1-146 (text provided on CD-ROM).

Mark Drake et al., Oracle Corporation, "Understanding the Oracle9i XML Type," 2004, http://otn.oracle.com/oramag/oracle/01-nov/o61xml.html?_template=/ocom/technology, data retrieved Jun. 29, 2004, pp. 1-5.

Johnathan Gennick, Oracle Corporation, "SQL in, XML out," 2004, http://otn.oracle.com/oramag/oracle/03-may/o33xml.html?_template=/ocom/technology, data retrieved Jun. 29, 2004, pp. 1-4.

Shelley Higgins, Oracle Corporation, "Oracle9i, Case Studies—XML Applications," Release 1 (9.0.1), Jun. 2001, Part No. A88895-01, pp. 1-462 (text provided on CD-ROM).

Shelley Higgins, Oracle Corporation, "Oracle9i, Application Developer's Guide—XML," Release 1 (9.0.1), Jun. 2001, Part No. A88894-01, pp. 1-1,362 (text provided on CD-ROM).

Oracle Corporation, "Oracle9i Application Server, Administrator's Guide," Release 2 (9.0.2), May 2002, Part No. A92171-02, Part No. A92171-02, pp. 1-392 (text provided on CD-ROM).

R. Bourret et al.; A generic Load/Extract Utility for Data Transfer Between XML Documents and Relational Databases, Jun. 8-9, 2000, IEEE Computing SOC., pp. 134-143.

* cited by examiner

FIG. 2

202 LINE NUMBERS

```
 1  ...
 2  <ORG>
 3      <EMPLOYEE ENO = "1">
 4          <ENAME> Linda </ENAME>
 5          <EADD> ... </EADD>
 6          <PERF> ... </PERF>
 7      </EMPLOYEE>
 8      <EMPLOYEE ENO = "2">
 9          <ENAME> Charles </ENAME>
10          <EADD> ... </EADD>
11          <PERF> ... </PERF>
12      </EMPLOYEE>
13      <EMPLOYEE ENO = "4">
14          <ENAME> Alice </ENAME>
15          <EADD> ... </EADD>
16          <PERF> ... </PERF>
17      </EMPLOYEE>
18      ...
19  </ORG>
```

201 XML DOCUMENT

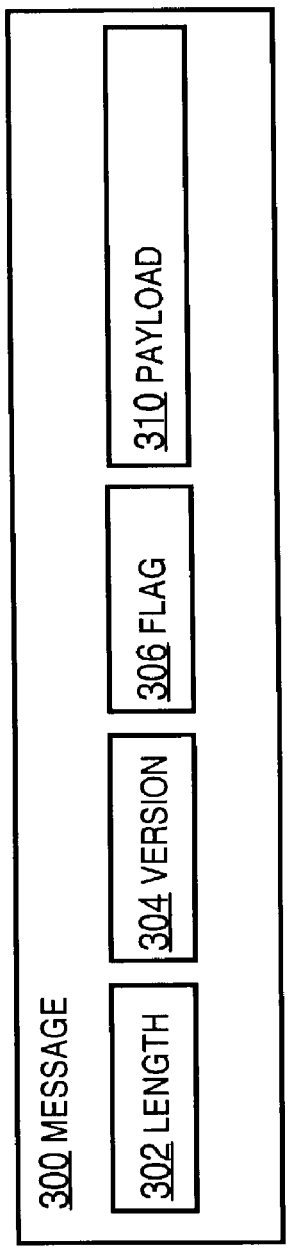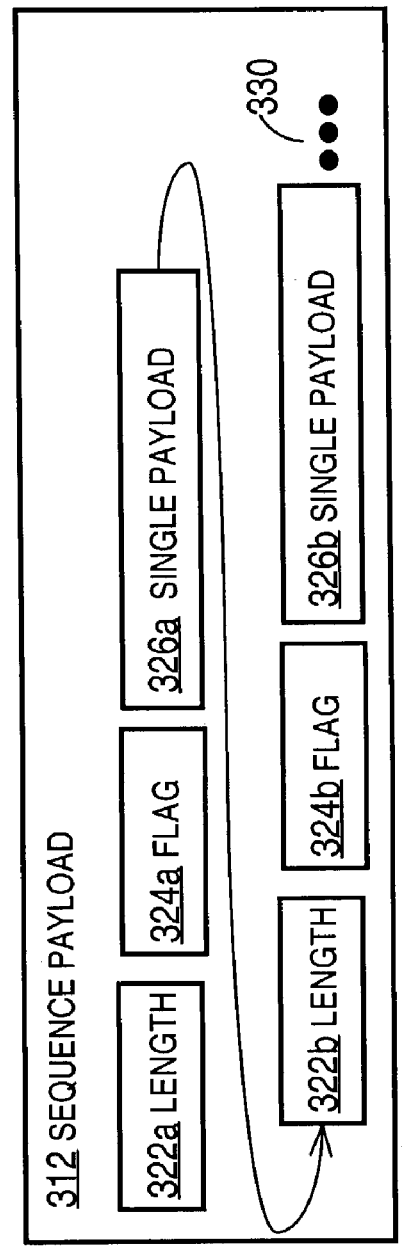

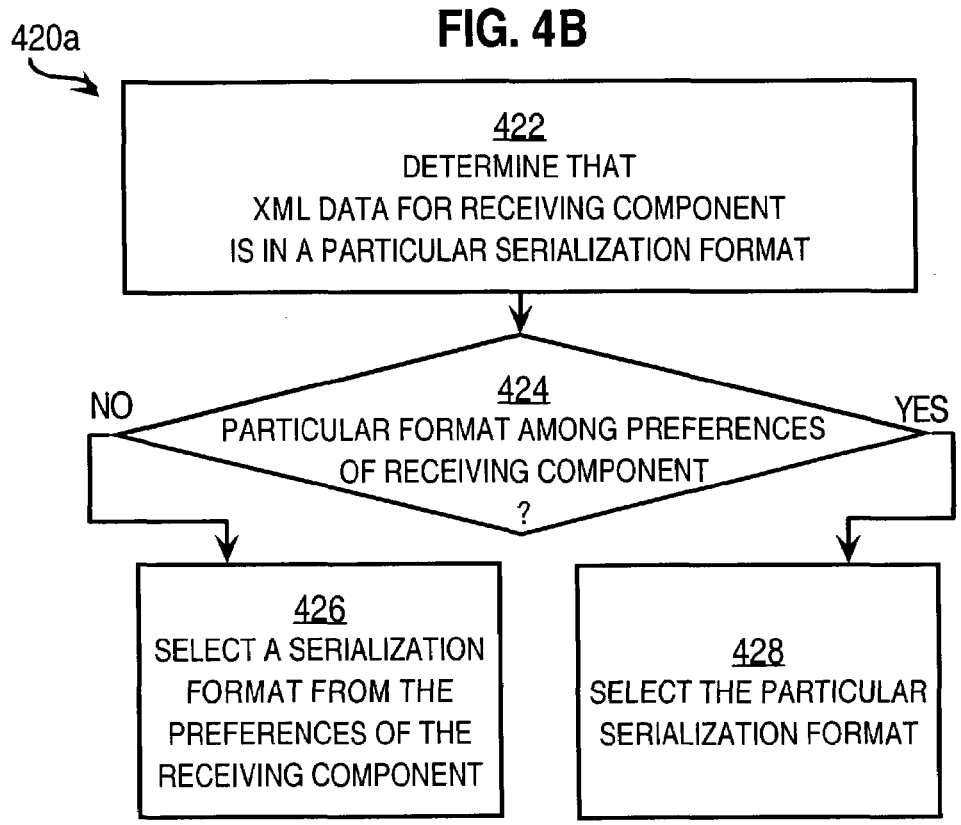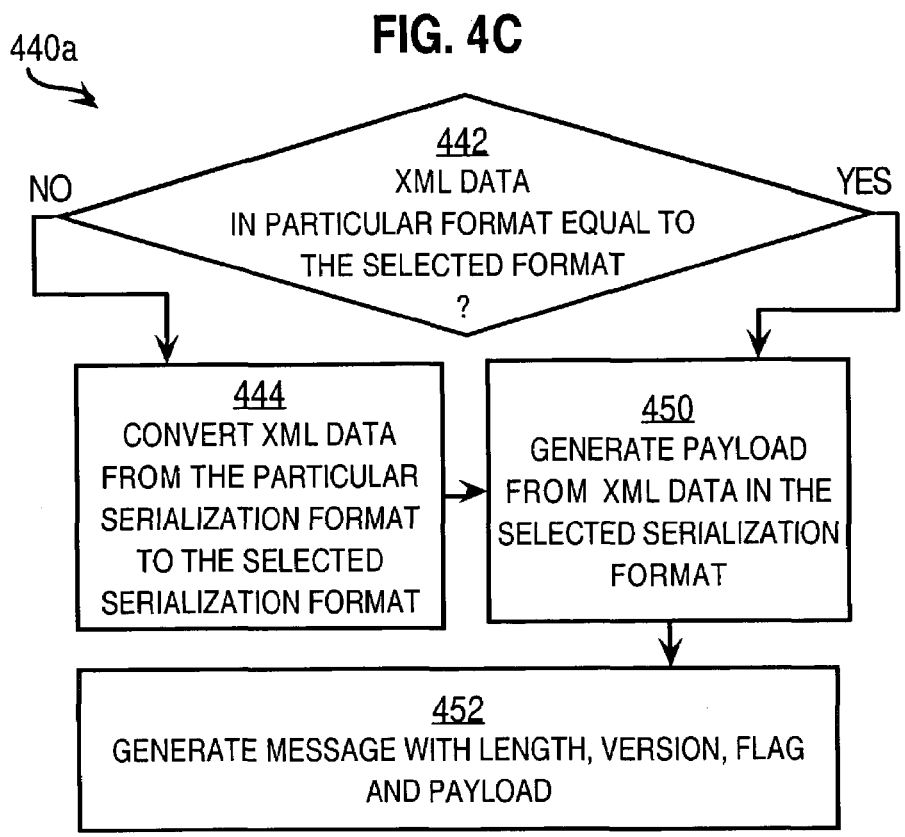

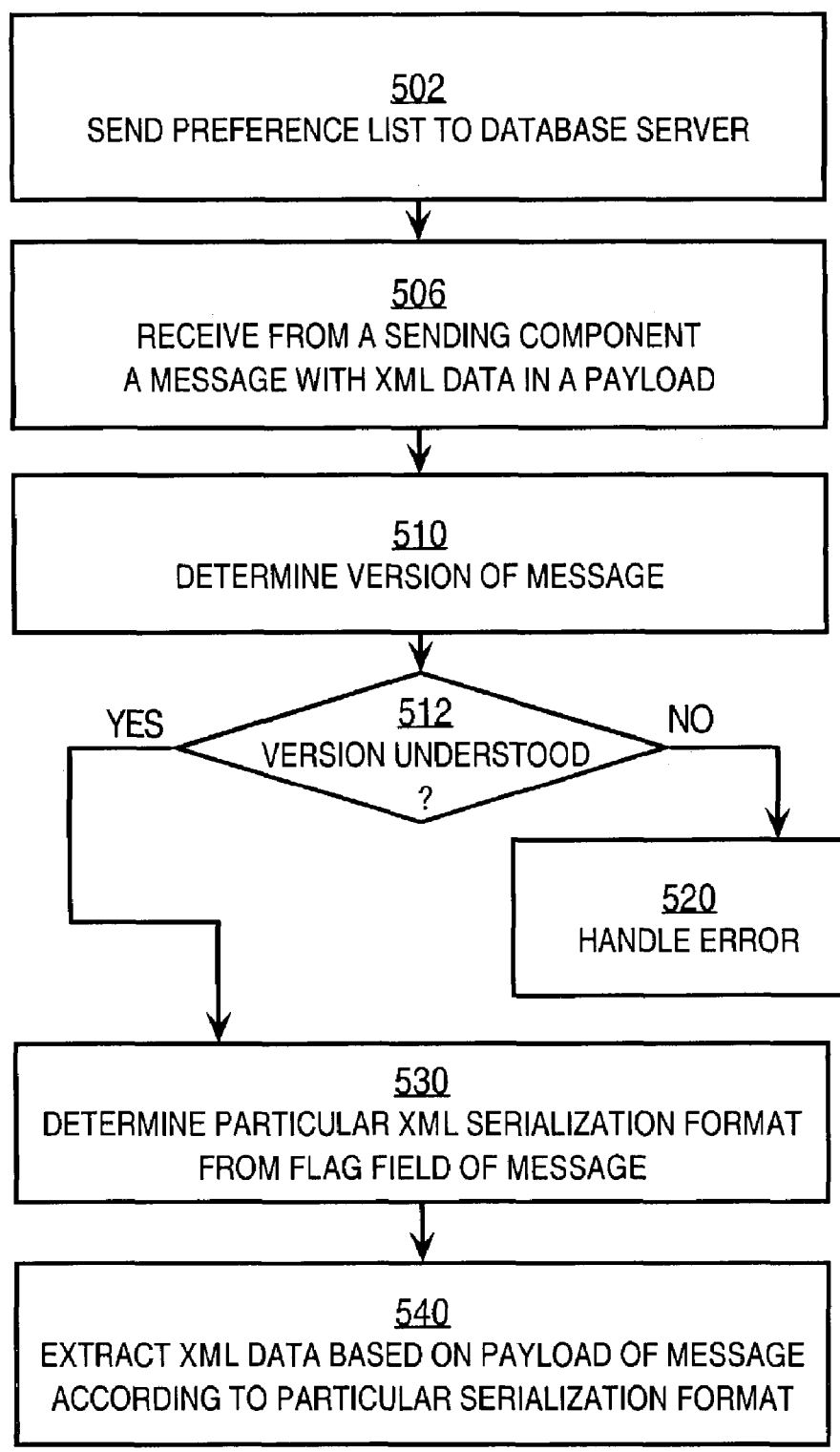

TECHNIQUES FOR TRANSFERRING A SERIALIZED IMAGE OF XML DATA

FIELD OF THE INVENTION

The present invention relates to techniques for using eXtensible Markup Language (XML) data in a relational database system.

BACKGROUND OF THE INVENTION

The World Wide Web (WWW) involves a network of servers on the Internet, each of which is associated with one or more Hypertext Markup Language (HTML) pages. The HTML pages are transferred between clients that make requests of servers and the servers using the Hypertext Transfer Protocol (HTTP). Resources available from servers on the Internet are located using a Universal Resource Locator (URL). The standards and protocols of the WWW are promulgated by the World Wide Web Consortium (W3C) through its servers at www.w3c.org, and are used on many private networks in addition to their use on the Internet.

The HTML standard is one application of a more general markup language standard called the Standard Generalized Markup Language (SGML). Recently, a subset of SGML that is more powerful and flexible than HTML has been defined and has gained popularity for transferring information over the Internet and other networks. The new standard, developed and promoted by W3C, is called the eXtensible Markup Language (XML). XML provides a common syntax for expressing structure in data. Structured data refers to data that is tagged for its content, meaning, or use. XML provides an expansion of the tagging that is done in HTML, which focuses on format of presentation. XML tags identify XML elements and attributes of XML elements. XML elements can be nested to form hierarchies of elements. As used herein, the term "XML construct" includes structures of the XML standard, including XML documents, XML elements, XML attributes of XML elements, and fragments of XML documents made up of several XML elements at the root level.

XML documents are designed to transfer hierarchical data between client and server processes distributed over a network of heterogeneous computing devices and operating systems. An XML document is transferred as a series of bits that represent a string of characters. The characters in the string indicate tags that mark a component of the XML document, such as an element or attribute. The characters that follow a tag indicate values for the tagged element or attribute, if any. Different character sets can be used in different XML documents.

Relational databases predate, and developed independently of, the World Wide Web. Relational databases store data in various types of data containers that correspond to logical relationships within the data. As a consequence, relational databases support powerful search and update capabilities. Relational databases typically store data in tables of rows and columns where the values in all the columns of one row are related. For example, the values in one row of an employee table describe attributes of the same employee, such as her name, social security number, address, salary, telephone number and other information. Each attribute is stored in a different column. Some attributes, called collections, can have multiple entries. For example, the employee may be allowed to have multiple telephone numbers. Special structures are defined in some relational databases to store collections.

A relational database management system (DBMS) is a system that stores and retrieves data in a relational database. The relational DBMS processes requests to perform database functions such as creating and deleting tables, adding and deleting data in tables, and retrieving data from the tables in the database. A well-known standard language for expressing the database requests is the Structured Query Language (SQL).

Object-relational databases extend the power of relational databases. Object-relational databases allow the value in a column to be an object, which may include multiple other attributes. For example, the value in the address column may be an address object that itself has multiple attributes, such as a street address, a city, a state, a country, and a zip code or equivalent. An abstract data type (ADT), also called an object type, defines the attributes of an object in an object-relational database. SQL has been extended to allow the definition and use of objects and object types in object-relational databases. As used hereinafter, the term "object-relational database" refers to a subset of relational databases that support object-relational constructs; and an object-relational construct is one example of a relational construct.

Because of the popularity of XML as a data exchange format that supports hierarchical relationships among elements, and because of the power of relational DBMSs to update and retrieve data, there is a demand for generating XML data output from relational databases and storing XML data into relational databases. To support this demand, some DBMSs define relational database constructs and object-relational database constructs for storing data for XML documents. Often, different attributes or elements of one XML document are stored in different object-relational constructs, such as in different tables or different columns or different rows. The use of object-relational constructs allows the DBMS to support powerful data manipulation and retrieval operations that involve the data for the XML documents (which data is hereinafter called, simply, "XML data").

Sometimes XML data stored in a relational DBMS is to be transferred from one component of a system to another, such as from a DBMS server to an application program that acts as a client of the DBMS server, or between two DBMS servers in a distributed DBMS, or from one process in the DBMS to another process in the DBMS.

In one approach, the XML data is extracted from one or more object-relational constructs in the DBMS and converted to an XML document that may be transferred over a homogeneous or heterogeneous network from a sending component to a receiving component. This approach takes advantage of the XML standard for such transfers. However, the XML standard is quite verbose, requiring many characters to specify tags and often requiring repetitive use of the same tags. Also an XML document is required to have a single root element with certain attributes that might not be necessary when it is desired to transfer a few particular XML elements.

A characteristic of the first approach includes converting data from object-relational constructs to an XML document. This conversion can consume considerable computational resources at the sending component. In addition, the XML document can consume considerable bandwidth on the communications channel to transmit the verbose document. Furthermore, the receiving component can consume considerable resources to parse the XML document and extract that portion of the document to be used.

A serial format for transferring XML data between components, which makes best use of the resources available to the components, depends upon the components and the shared and unshared resources available to the components. It would be desirable if, in some circumstances, XML data could be transferred between components in a more compact format than the verbose, standard XML document.

For example, if the receiving component uses object-relational constructs to store the received XML data, additional computational resources are used at the receiving component to convert the XML document back to object-relational constructs. In such circumstances, it would be preferable if XML data that is already distributed among one or more object-relational constructs at the first component were transferred in a format for object-relational constructs that can be used directly by the receiving component. The object-relational constructs are often less verbose, consuming less bandwidth during the transferal. Also fewer computational resources are consumed on both the sending and receiving components, because the XML data are not converted back and forth to a verbose XML document.

In some DBMSs, memory or persistent storage space, or both, are shared among some components, such as two processes of the DBMS on the same host computer. Transferring XML data in object-relational constructs between such components could be accomplished by transferring a reference to the proper location in shared memory or on storage for the constructs holding the XML data to be transferred, without converting back and forth to a verbose XML document.

Based on the foregoing, there is a clear need for techniques to allow multiple serial formats for transferring XML data between components of a system that uses a DBMS to store XML data and to select a format that makes better use of the resources available to the components.

The approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram that illustrates a portion of an example XML document in the standard XML document format;

FIG. 3A is a block diagram that illustrates a message for transferring a serialized image of XML data based in any of several serialization formats, according to an embodiment;

FIG. 3B is a block diagram that illustrates a sequence payload that may be included in the payload of FIG. 3A, according to an embodiment;

FIG. 4B is a flow diagram that illustrates an embodiment of a step of the method of FIG. 4A;

FIG. 4C is a flow diagram that illustrates an embodiment of a different step of the method of FIG. 4A;

FIG. 5 is a flow diagram that illustrates a method for transferring a serialized image of XML data to a receiving component, according to an embodiment.

DETAILED DESCRIPTION OF THE INVENTION

Figure 1:
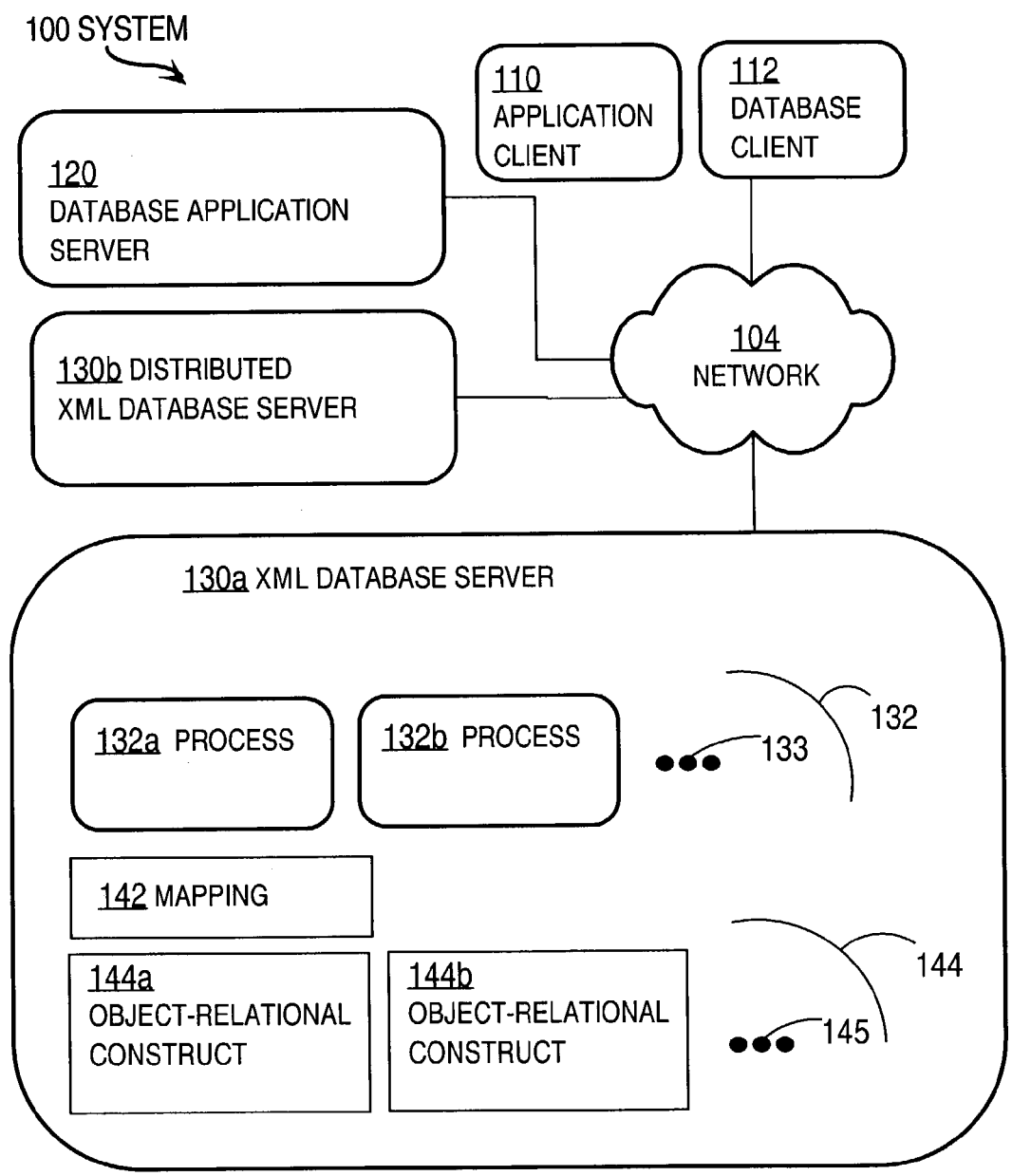
FIG. 1 is a block diagram that illustrates a database system which includes a database server that stores XML data in one or more relational constructs.

Techniques are described for transferring a serialized image of data for an XML construct. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to one aspect of the invention, techniques for transferring a serialized image of data for an XML construct includes selecting a format from multiple different XML serialization formats. The XML serialization formats represent, in a database system, data for XML constructs as a series of data units, such as a series of bytes representing characters or bits, bytes or octets representing binary values. A message is generated that includes a payload and a payload type field. The payload includes particular serialized data that represents particular data for a particular XML construct in the selected format. The type field includes data that indicates the selected format. The message is sent from a sending component of the database system to a different receiving component of the database system. The components may be different processes in the same database server, or processes in different servers of a distributed database system, or include a process at a database client, or a database application, among other possible components.

These techniques allow the format selection to be based on characteristics, such as preferences and versions, of the sending or receiving components or both, and to make better use of the resources available to the two components.

In some embodiments of this aspect, the techniques include determining a set of preferences at the receiving component for one or more XML serialization formats. The selected format is selected based on the set of preferences.

In some embodiments of this aspect, the techniques include determining a version that indicates a particular form for the type field and the payload understood at the receiving component. The selected format is selected based on the version.

In some embodiments of this aspect, the techniques include receiving a query to generate the particular data for the particular XML construct and evaluating the query. During the evaluation of the query, the particular serialized data is generated in the selected format.

According to another aspect of the invention, techniques include receiving at a receiving component of a database system a message. The message includes a type field and a payload. The type field includes data that indicates a first format of multiple different XML serialization formats. The payload includes particular serialized data that represents, in the first format, particular data for a particular XML construct. The particular data are extracted based on the payload and the first format.

In some embodiments of this aspect, receiving the message includes receiving a version that indicates a particular form for the type field and the payload. It is determined whether the version indicates that the form is understood at the receiving component. The particular data is extracted only if it is determined that the form is understood at the receiving component.

These techniques allow the message to accommodate new formats as they are developed; and receiving components are allowed to avoid using any new formats that the receiving components do not understand.

Embodiments of the invention are described in the following sections in the context of a distributed, object-relational DBMS that allows XML data to be stored, queried and retrieved in object-relational constructs, that includes an XML type ADT for some XML constructs, and that supports queries with XML expressions. A DBMS with these characteristics is the Oracle 9i Server database system commercially available from Oracle Corporation, Redwood Shores, Calif. However, the invention is not limited to such a DBMS and may be practiced in any DBMS that allows XML data to be stored in forms other than a standard XML document.

Structural Overview

FIG. 1 is a block diagram that illustrates a distributed database system 100 upon which embodiments of the invention may be practiced. The system 100 includes two XML database servers 130a, 130b (collectively referenced hereinafter as XML database servers 130), a database application server 120, an application client 110, and a database client 112, all connected to network 104. In other embodiments there may be more or fewer servers and clients. In the illustrated embodiment, the servers 120, 130 and clients 110, 112 reside on different computing devices and communicate through network 104, but in other embodiments any or all of the servers 120, 130 and clients 110, 112 may reside on the same computer device. Each computer device may use the same operating system and other software or different operating systems and other software.

The XML database servers 130 store XML data in one or more object-relational constructs. For example, XML database server 130a stores XML data in object-relational constructs 144 including object-relational constructs 144a, 144b, and others indicated by ellipsis 145. A mapping 142 records metadata that relates object-relational constructs to XML constructs in XML documents of a given XML document type. At any one time, the database server may execute one or more processes 132, such as processes 132a, 132b and others indicated by ellipsis 133. For example, a cache management process may run simultaneously with a user connection process. In other embodiments, more or fewer object-relational constructs 144, processes 132 and mappings 142 may be used.

The database application server 120 uses the database servers 130 to store and retrieve data used by the application. For example, the application server is a human resources system for an enterprise. The application client 110 requests application services from application server 120. The database client 112 requests database services from database servers 130a, 130b.

XML data for one or more XML constructs is stored in one or more object-relational constructs 144 on one or more of XML database servers 130 and transferred from one component of the system, such as process 132a to another component of the system such as application client 110 or process 132b.

Multiple Serialization Formats

FIG. 2 is a block diagram that illustrates a portion of an example XML document 201 in the standard XML document format. Line numbers 202 indicates different parts of this portion of the example XML document 201. The ellipsis on line 1 indicates other data in the document 201.

An element called "ORG" is indicated by the opening tag "<ORG>" on line 2 and the closing tag "</ORG>" on line 19. The element ORG includes three "EMPLOYEE" elements indicated by opening tags on lines 3, 8, 13, respectively, and closing tags on lines 7, 12, 17, respectively. The element ORG includes other elements (not shown) indicated by the ellipsis on line 18. Each EMPLOYEE element has an attribute "ENO" for an employee number in the opening tag that has an associated value that follows the symbol "=". Each EMPLOYEE element also includes three sub-elements called "ENAME", "EADD" and "PERF", respectively. For example, these three sub-elements appear with opening and closing tags on lines 4–6 for the first EMPLOYEE element, on lines 9–11 for the second EMPLOYEE element, and on lines 14–16 for the third EMPLOYEE element. Values are given for the ENAME elements between the opening and closing tags. Values for the other elements are indicated by ellipses between the opening and closing tags for the other elements.

The standard XML document format is one serialization format. Although shown in FIG. 2 as a series of lines for easy understanding by a human reader, when an XML document is transferred it is done so one character at a time in the order shown in FIG. 2 with no line changes or indentations to indicate nesting or level in a hierarchy. Thus serialized XML data of the XML document 201 is a series of characters that represents opening and closing tags, attributes and values. For example, the series of characters

```
<ORG><EMPLOYEE ENO = "1"><ENAME> Linda
</ENAME><EADD> . . . </EADD><PERF> . . .
</PERF></EMPLOYEE><EMPLOYEE ENO = "2"><ENAME>
Charles </ENAME><EADD> . . . </EADD><PERF> . . .
</PERF></EMPLOYEE>
``` etc. is serialized XML data of XML document 201. To differentiate this format from other formats described below, this format is called hereafter the "TEXT" format. The TEXT format may be used to transfer XML data from any component to any other component of a database system.

Other formats may be used to serialize XML data and transfer such serialized data between at least some components in a database system. Table 1a lists the serialization formats described in more detail below. In addition to the formats listed in Table 1a, new serialization formats may be developed in the future and used with embodiments of the invention. A serialized image is constructed from serialized data by adding other information employed to use the serialized data after it is sent, such as length of the serialized data and information about how the serialized data is generated.

TABLE 1a

Example serialization formats

| Format Type | Format description |
|---|---|
| TEXT | standard XML construct text string |
| COMPRESSED | compressed standard XML construct text string |
| LOB | a locator for a large object (LOB) that holds text or compressed XML data on persistent storage for a database server |
| XMLREF | a reference to an object of XML type in the memory or persistent storage of a database server |
| POINTER | a physical pointer to a memory location where an XML type object resides |
| OBJIMG | a serialized image for object-relational constructs native to the database server |
| SEQUENCE | the serialized data includes a sequence of multiple images of serialized XML data |

The COMPRESSED format indicates that the serialized data is formed by compressing the text string of the standard XML construct. Many compression techniques are known and are commercially available; any may be used to serialize the text string. In some embodiments, several compressed formats are allowed; they are differentiated by well-known identifiers embedded in the serialized image of the compressed data. For purposes of illustration, it is assumed that one compression technique is used and it is indicted by the COMPRESSED format. Thus COMPRESSED serialized data for the XML construct 201 is a series of bits that can be un-compressed using commercial techniques to generate text that represents opening and closing tags, attributes and values. The COMPRESSED format may be used to transfer XML data from any component to any other component of a database system that has the means to perform the un-compression, such as clients 110, 112, and application 120. It is assumed for purposes of illustration, that most frequently executing database server processes 132 do not include compression and un-compression mechanisms in order to keep those processes small and efficient. Thus the COMPRESSED format would often not be used to transfer XML data from one database server process, such as 132a, to another, such as 132b.

The LOB serialization format in Table 1a indicates that the serialized data includes a locator for a LOB stored by a database server 130 on persistent storage. The LOB may be temporary or permanent. For example, an XML element may be transferred between processes 132a and 132b, which both have access to LOB 144b, by passing the LOB locator. The receiving process is able to read the LOB locator and fetch the corresponding XML data, using LOB read function calls. This saves the computational resources that would be consumed by having the sending process reconstruct an XML construct from the LOB and saves the bandwidth resources that would be consumed by sending the XML construct to the receiving process.

The XMLREF serialization format in Table 1a indicates that the serialized data includes a reference for a XML type object used by a database server 130 to represent XML constructs. The object type reference gives a logical pointer to the XML data. The receiving component can access the XML data by resolving the object type reference.

The POINTER serialization format in Table 1a indicates that the serialized data includes a physical pointer to an XML type object in memory. A receiving component that shares memory access with the sending component can access the XML data directly using the physical pointer.

For purposes of illustrating the next serialization format, it is assumed that database server 130a stores data for the EMPLOYEE elements of XML document 201 as rows in an EMP table that corresponds to object-relational construct 144a. A mapping based on a schema is used to relate these object-relational constructs to XML constructs. Such a mapping is described in U.S. patent application Ser. No. 10/259,278 by Ravi Murthy et al., filed Sep. 27, 2002 (hereinafter "Murthy"), the entire contents of which are hereby incorporated by reference as if fully set forth herein.

The table 144a in FIG. 1 has an ENO column for storing values of the employee number, a ENAME column for storing a name of the employee, an EADD column for storing the address of the employee, and a PERF column for storing personnel performance reviews received by the employee. The mapping 142 associates these columns with XML attribute ENO, and XML elements ENAME, EADD, PERF respectively. The mapping 142 also indicates that a scalar number is stored in column ENO, and that scalar text is stored in column ENAME. The mapping 142 also indicates an object type is stored in column EADD with object attributes street, city, state, country, and postal code. The mapping 142 also indicates that a LOB locator for a LOB is stored in column PERF and that the data for the LOB reside in a particular object-relational construct, such as object-relational construct 144b. Each different row in the EMP Table 144a corresponds to a different EMPLOYEE element in the XML document 201.

The OBJIMG serialization format in Table 1a indicates that the serialized data includes a serialized image of an object in an object-relational database. An example serialized object image is described in U.S. Pat. No. 6,128,621 by John Weisz, issued Oct. 3, 2000 (hereinafter Weisz), the entire contents of which are hereby incorporated by reference as if fully set forth herein. For example, an object in the EADD column of table 144a, which corresponds to an XML element EADD of a particular employee, may be serialized according to Weisz. The serialized object data may be transferred from database server 130, which has a mechanism to serialize objects, to database client 112, which has a mechanism to reconstruct objects from serialized object data.

The objects that store the XML data are often less verbose than a standard XML construct because the tags often appear only once in the metadata for the object and are not constantly repeated, as in a standard XML construct. Thus the use of serialized objects often saves bandwidth that would be consumed if a standard XML construct were transferred between components. In some respects, OBJIMG format represents a compression format based on the metadata.

In addition, the object-relational image often serializes object-relational constructs in a native format for one or more components, such as database servers 130a and 130b. The use of a native format reduces the computational resources consumed to convert from the object-relational constructs to the serialized form of the data.

The SEQUENCE serialization format in Table 1a indicates that the serialized data includes a sequence of multiple serialized images for XML data. This format is useful for transferring several serialized images in the same message. For example, this format is useful for including serialized data for several XML constructs in the same message. The use of this format is described in more detail in a later section.

The serialization formats that may be used with embodiments of the invention are not limited to the list of formats described here. In other embodiments, other serialization formats are also used.

Optional Properties for Serialization Formats

Optional information may be included in some messages sent between components. For example, an XML construct transferred as a serialized object may use a schema mapping that is unknown to the receiving component. In this case, information identifying a schema, such as a URL address or an internal identifier, is included in the payload. A URL identifying a schema need not be sent if the receiving component already knows the schema from a previous message or if a default schema is the correct schema. Therefore, the URL schema is an optional property in a message. The optional properties according to one embodiment are listed in Table 1b. In other embodiments, more or fewer optional properties are utilized in the messages.

TABLE 1b

Optional properties

| Property Type | Property description |
| --- | --- |
| SCHEMA | an XML schema identifier that describes a type of XML document |
| SNAPSHOT | a snapshot that indicates a certain state of the database |
| CHARSET | a character set identifier for a character set to use in an XML construct |

The SCHEMA optional property in Table 1b indicates that the serialized data includes data indicating an XML schema for an XML document type. In the example DBMS, an XML schema with additional comments is used to describe a mapping between XML constructs and object-relational constructs. A receiving component employs an XML schema received in serialized data to map objects, such as the reconstructed objects described above, to XML constructs, so that the receiving component can reconstruct the XML data being transferred.

The SNAPSHOT optional property in Table 1b indicates that the serialized data includes a snapshot that indicates a particular state of the database. The snapshot information received in serialized data may be used with the data received in the serialized data using the XMLREF format to retrieve XML data as of a particular state of the database.

The CHARSET optional property in Table 1b indicates that the serialized data indicates a particular character set used by XML data. Computers used in different nations of the world may use different character sets. For example, in the United States a string of bits may represent the letter "A" whereas in Japan the same string of bits may represent a Katakana character or pictograph. Thus, the same string of bits may have an entirely different meaning depending on the character set in use.

Extensible Message Structure for Serialized Images

Given the variety of formats for serializing XML data described in the previous section, it is desirable to generate messages between components of a system, which can accommodate any serialization format. 3A is a block diagram that illustrates a message 300 for transferring serialized XML data based on any of several serialization formats, according to an embodiment.

Message 300 includes four fields: a length field 302; a version field 304; a flag field 306; and a payload field 310. The combination of fields 302, 304, 306, 310 composes a serialized image of XML data, according to the illustrated embodiment.

Length field 302 includes data that indicates the length of the serialized image. Any method known in the art for indicating length may be used.

Version field 304 includes data that indicates the version of the type field and payload used in the message and described in the following paragraphs. Any method known in the art for indicating version may be used. For purposes of illustration, it is assumed that numbers starting with the number 1.0 indicate versions, and that later versions have larger numbers than earlier versions. When changes occur in the representation or use of one or more of the serialization formats in the messages sent between components, the version can be incremented. For example, if the length of the type field is increased, the version is incremented. A receiving component can understand serialization formats up to a certain version associated with the receiving component. When a message is received with a version greater than the certain version associated with the receiving component, the receiving component is made aware that the receiving component might not understand one or more of the serialization formats that are used by the message and indicated in the type field. For purposes of illustration, it is assumed that the version field 304 has a constant length of one byte.

Flag field 306 includes data that indicates the type of serialization format used in the payload field and any optional properties included in the payload. Any method known in the art for indicating one of several types may be used. For example, in some embodiments, type may be indicated by a name, such as the names in the left column of Table 1a. In other embodiments, each bit in the flag field 306 represents a different serialization format. For purposes of illustration, it is assumed that the flag field 306 has a constant length of four bytes and that each type is indicated by a number, such as the number of the row in Table 1a corresponding to the type. New serialization formats are added by adding new legal values for the flag field 306.

Payload field 310 includes serialized XML data for a particular XML construct. Any method known in the art for serializing XML data may be used. For purposes of illustration, it is assumed that the serialized data takes one of the forms associated with the serialization formats in Table 1a. For example, if the flag field 306 indicates that the type is TEXT, the payload includes the character string of the standard XML construct, such as the characters in the document of FIG. 2. If the flag field 306 indicates that the type is LOB, then a locator for the LOB appears in the payload, such as the octal string "0x 0000303030303030 . . . ".

A serialized image of the XML data includes the fields 302, 304, 306, 310. For example, if the LOB locator is 80 bytes long, then the serialized image of a PERF element for the XML document 201 may be represented by the values in the fields given in Table 2.

TABLE 2

Example values of serialized image of XML data

| FIELD | VALUE |
| --- | --- |
| LENGTH | 85 |
| VERSION | 1 |

TABLE 2-continued

Example values of serialized image of XML data

| FIELD | VALUE |
|---|---|
| FLAG | LOB |
| PAYLOAD | 0x0000303030303030 . . . |

Sometimes it is desirable to include serialized data for several types in the same payload. For example, it may be desirable to send data for two XML constructs in the same payload. The SEQUENCE type in the flag field 306 indicates a payload with data for multiple XML constructs (called herein a "sequence payload"). FIG. 3B is a block diagram that illustrates a sequence payload 312 that may be included in the payload 310 of FIG. 3A, according to an embodiment.

The sequence payload 312 includes multiple sets of a length field, a flag field and a single payload field. For example, sequence payload 312 includes length field 322*a*, flag field 324*a*, and single payload field 326*a*, followed by length field 322*b*, flag field 324*b*, and single payload field 326*b*, and zero or more additional sets indicated by ellipsis 330. Each set of length field (e.g., 322*a*, 322*b* collectively referenced as length field 322), flag field (e.g., 324*a*, 324*b* collectively referenced as flag field 324) and single payload field (e.g., 326*a*, 326*b* collectively referenced as single payload field 326) composes one serialized image of XML data.

The SEQUENCE type can be used to transfer XML data as objects in an object-relational database at a particular state of the database using an unusual character set and a particular XML schema to map the objects to XML constructs. For example, the values in Table 3 for the serialized image indicate that three XML constructs are included in the same payload, one serialized as an OBJIMG with optional SCHEMA, the second as a LOB with optional snapshot data, and the third as text with an optional character set. It is assumed for purposes of illustration, that the character set indicator is one byte long, and the text is 200 bytes long, that the XML schema indicator is four bytes long and the object image is 200 bytes long, and that the snapshot is 80 bytes long.

TABLE 3

Example values of serialized image of XML data with sequence payload

| FIELD | VALUE |
|---|---|
| LENGTH | 286 |
| VERSION | 1 |
| FLAG | SEQUENCE |
| LENGTH | 204 |
| FLAG | OBJIMG and SCHEMA |
| PAYLOAD | . . . |
| LENGTH | 160 |
| FLAG | LOB and SNAPSHOT |
| PAYLOAD | . . . |
| LENGTH | 201 |
| FLAG | TEXT and CHARSET |
| PAYLOAD | . . . |

This extensible message format allows a message to accommodate new formats as they are developed. The version field allows receiving components to avoid attempts at using any messages that the receiving components do not understand.

Method for Transferring a Serialized Image from a Sending Component

Figure 4A:
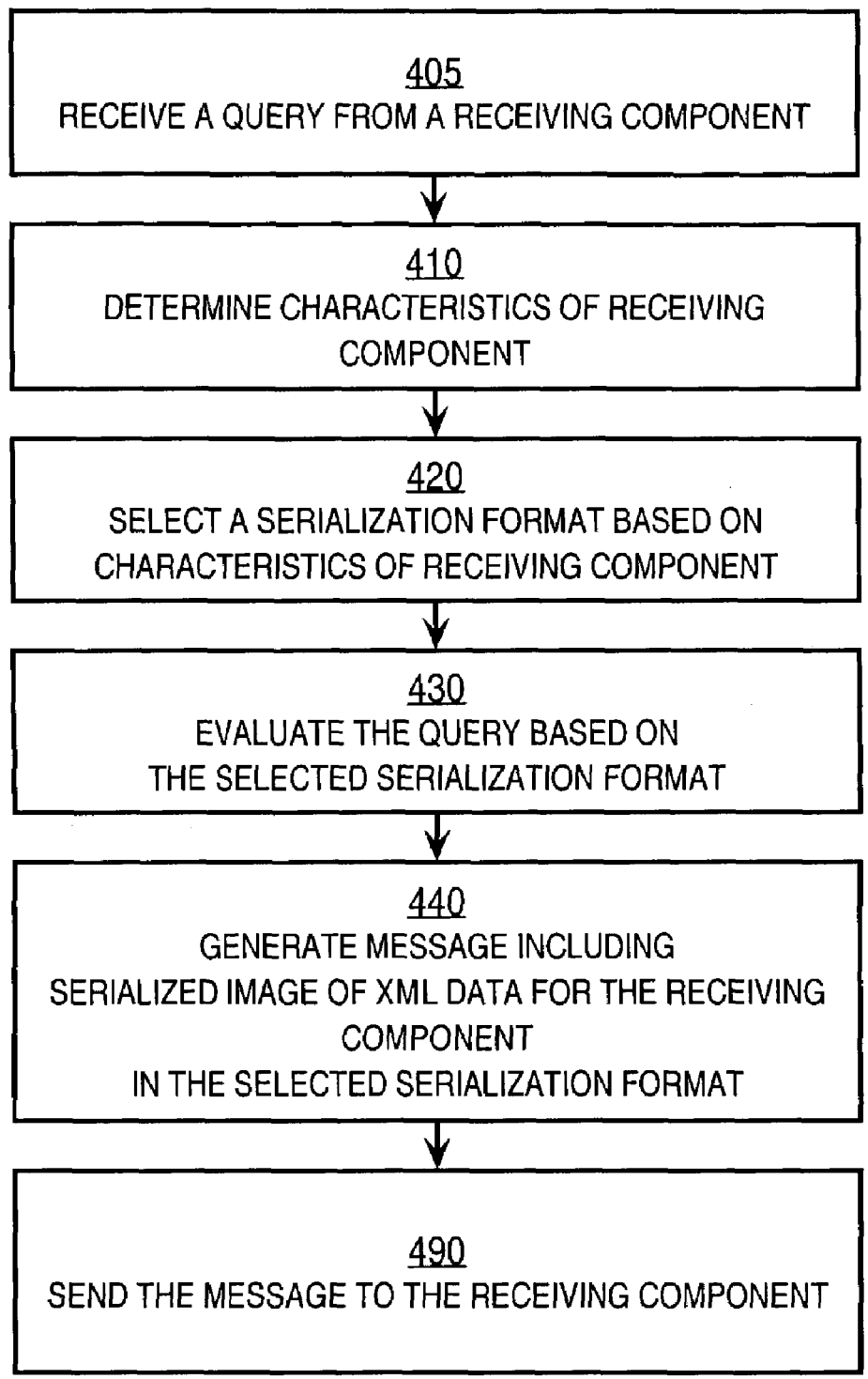
FIG. 4A is a flow diagram that illustrates a method for transferring a serialized image of XML data from a sending component, according to an embodiment.

FIG. 4A is a flow diagram that illustrates a method 400 for transferring a serialized image of XML data from a sending component, according to an embodiment. Although steps are depicted in FIG. 4A and subsequent flow diagrams in a particular order, in other embodiments the steps may be performed in a different order, or may overlap in time.

In step 405, a query is received at a sending component from a receiving component. For example, a query is received at database server 130*a* from application server 120. In some embodiments, step 405 may be omitted. For example, XML data may be sent from a sending process 132*a*, such as a cache manager process, to a receiving process 132*b*, such as a disk write process, without receiving a query from the receiving process 132*b*.

Detecting Receiving Component Characteristics

In step 410, the sending component determines characteristics of the receiving component. The receiving component should be a system component that can understand and use the serialized image to be transferred. Some serialized images cannot be used at some system components. For example, a serialized image in the POINTER format, which includes physical pointers to memory locations in the sending component's memory area, cannot be used by a receiving component that does not share that memory area. If the memory location used by the sending component is not shared with any process, no receiving component is able to use a serialized image in the POINTER format.

In some embodiments, the sending component infers the capabilities of the receiving component by default. For example, it may be inferred that a database client 112 does not share memory with a process 132 on the database server. As another example, it may be inferred that a HTML client (a "web browser") cannot process a database specific format such as the LOB format, XMLREF format, POINTER format or OBJIMG format.

In some embodiments, the sending component determines the capabilities of the receiving component using context information maintained by the database servers 130. In some embodiments, a database server 130 maintains context information in one or more object-relational constructs 144. Conventional context information maintained by a database server includes data that indicates the user name and user privileges and connection properties, among other data associated with a user of a database. A user of the database includes any of the application server 120, a user of application client 110, and a user of database client 112, among others.

According to some embodiments, the context information is extended to include a preference list of one or more XML serialization formats. The preference list associated with a user includes data that indicates the serialization formats that can be used and understood by the user's process, such as application server 120, application client 110, and database client 112. In some embodiments, the database server 130 statically infers the list based on the process that makes the connection to the database server. In some embodiments, the database server 130 dynamically receives the list from the user's process upon establishing the connection with the user's process. In some embodiments, the list includes the values for the flag field 306 that the user's process can use and understand. In some embodiments, the preference list associates a preference number with each value for the flag field 306. For example, any number between 1 and 10 indicates an ability to use an associated serialization format, with the higher numbers associated with serialization formats that are more advantageous for the user's process. A preference list with format types but without preference values can be called a capabilities list.

For example, upon connection with database server 130a, database client 112 may provide a preference list as shown in Table 4. This list indicates that the database client 112 can accept serialized XML data in any of the serialization formats listed. This list also indicates that the client 112 most prefers to receive the XML data in the TEXT format, followed closely by XML data in either the LOB or OBJIMG formats. The list indicates that client 112 is willing to accept XML data in the REF format if no other acceptable format is available.

TABLE 4

Example preference list for database client

| FLAG VALUE | PREFERENCE VALUE |
|---|---|
| TEXT | 10 |
| LOB | 9 |
| OBJIMG | 9 |
| REF | 2 |

As another example, if the receiving process 132b is an export process that dumps XML data to disk, the export process cannot use any serialized data that uses transient values of the database system 100, such as values in a POINTER format, LOB format for a temporary LOB, or REF format, or sometimes even values in an OBJIMG. The preference list for such an export process might include only the TEXT flag value.

In some embodiments, step 410 includes determining a receiving component version number that indicates the highest version of message forms that the receiving component can understand.

In some embodiments, step 410 is omitted, and every user is assumed to share a default preference.

In step 420, the sending component selects a serialization format based on the characteristics of the receiving component. In some embodiments, the format is selected based on the preferences list (such as a capabilities list); in some embodiments, the format is selected based on the version number of the receiving component; and in some embodiments the format is selected based on the version of the receiving component in combination with the preferences list (such as a capabilities list). In some embodiments, during step 420, the sending component selects a serialization format based, not on the characteristics of the receiving component, but on some other selection criteria, such as the characteristics of the XML data available or the characteristics of the sending component itself.

FIG. 4B is a flow diagram that illustrates an embodiment 420a of step 420 of the method 400 of FIG. 4A, when the XML data to be sent is already serialized, such as in a serialized XML image. In step 422, the sending component determines that the XML data to be sent is already serialized in a particular serialization format. If so, control passes to step 424.

In step 424, it is determined whether the particular serialization format is among the preferences list (such as a capabilities list) of the receiving component. For example, it is determined whether the particular serialization format is among the formats listed in the first column of Table 4. If not, control passes to step 426. If so, control passes to step 428.

In step 428, the particular serialization format already used for the serialized XML data is chosen as the selected serialization format. This is done even if the particular format is not the format with the highest preference value in the preference list of the receiving component, because this selection reduces the consumption of computational resources by the sending component.

In step 426, a different serialization format is selected from the preferences list (such as a capabilities list) of the receiving component. In some embodiments, step 426 selects a serialization format from the receiving component's preferences list that has the highest preference value, provided that format is possible. For example, if XML data is already serialized in the COMPRESSED format, which is not in the preferences list of Table 1a, then control passes to step 426 to select a different format. The highest preference value in Table 4 is associated with the TEXT format. Therefore the TEXT format is selected as the serialization format during step 426.

The highest preference value may not be a possible format in some circumstances. For example, it is assumed for purposes of illustration that serialized XML data uses the LOB format. It is further assumed that the highest preference value of the receiving component preference list is associated with the OBJIMG format, and the next highest preference value is associated with the XMLREF format, and the lowest preference value is associated with the TEXT format. The sending component may determine that it is impossible or difficult or wasteful to convert the XML serialized image from the LOB format to the OBJIMG or XMLREF formats. Therefore, during step 426, the sending component selects the TEXT format, the next format on the preference list of the receiving component.

If the XML data to be sent is not already serialized, then in some embodiments, control passes to step 426 to select the format associated with the highest preference value that is possible or reasonable to generate. For example, the XML data to be sent is not yet serialized if the data has not yet been generated. The XML data is not yet generated, for example, if the XML data is generated by a query that has not yet been evaluated.

Evaluating Queries for XML Data

Returning to FIG. 4A, control passes from step 420 to step 430. In step 430 a query is evaluated based on the selected serialization format. By evaluating a query to generate XML data in the selected serialization format, computational resources are saved that would be consumed by generating the results of the query in a different default format and then converting the XML data to the selected serialization format. If there are functions that generate XML values and it is known that the receiving component prefers, or can only understand, XML data in a particular format, then this information is passed to the XML generation function. The XML generating function then generates serialized XML data, or a serialized image, with the particular serialization format.

For example, if the selected format is TEXT and a query involves the SQL expression

SELECT XML TYPE(PERF . . . )

then the XMLTYPE function converts the data in the LOB to the character string "<PERF> . . . </PERF>" as the serialized XML data from the LOB where the PERF value for an employee is stored. In some embodiments, the function generates more of the serialized image itself, including the length field, or the version field, or flag fields, or some combination of these fields. If the selected format were LOB, instead of TEXT, then the XMLTYPE function generates the serialized XML data as a LOB locator, e.g., "0x0000303030303030 . . . ", with or without the other fields of the serialized image, depending on the embodiment.

In some embodiments, the XML generation function performs step 420 to refer to the preference list or capability list in the metadata or context data maintained by the database server and to select the serialization format, before generating the XML data.

In some embodiments, step 430 is omitted. For example, in embodiments in which step 405 is omitted, step 430 is also omitted. In some embodiments, step 430 is omitted because the query is evaluated according to conventional means, without regard to the format preferences of the receiving component. In some embodiments, step 430 is omitted because the serialization format to be selected is not known at the time the query is compiled, such as when the receiving component is not known at the time the query is compiled.

Transferring a Serialized Image from the Sending Component

Control then passes to step 440. In step 440 a message is generated that includes the serialized image of the XML data in the selected format. For example, message 300 is generated that includes the serialized image composed of the length field 302, the version field 304, the flag field 306, and the payload field 310 with appropriate values.

FIG. 4C is a flow diagram that illustrates an embodiment 440a of step 440 of the method 400 of FIG. 4A. In step 442, it is determined whether the XML data is already in a particular format that is the same as the selected format. If so, control passes to step 450 to generate values for the payload field 310 using the XML data as it is. If not, control passes to step 444 to convert the XML data from the particular format to the selected format before generating the payload.

Steps 442 and 444 may be omitted in embodiments in which a query is evaluated to generate XML data in the selected format during step 430.

In step 452, the serialized XML image is generated for the message by including values for the length field 302, version field 304, and flag field 306 along with the payload. In embodiments in which the query is evaluated to generate an entire serialized image, with length, version, and flag fields, step 452 involves simply inserting the serialized XML image into the message.

Returning to FIG. 4A, control passes to step 490. In step 490, the message is sent to the receiving component.

The method of FIG. 4A allows the format selection to be based on characteristics, such as preferences and versions, of the sending or receiving components or both, and to make better use of the resources available to the two components.

Method for Transferring a Serialized Image to a Receiving Component

FIG. 5 is a flow diagram that illustrates a method 500 for transferring a serialized image of XML data to a receiving component, according to an embodiment.

In step 502, the receiving component sends a preference list (such as a capabilities list) to the database server for use by the sending component. For example, database client 112 sends the preference list illustrated in Table 4 to the database server 130a. Step 502 may be omitted when the capabilities or preferences of the receiving component are inferred by the sending component. In some embodiments, step 502 includes maintaining a preference list (such as a capabilities list), or a maximum version number, or some combination, at the receiving component In step 506, the receiving component receives a message with a serialized XML image. For example, database client 112 receives the message 300 depicted in FIG. 3A with the seralized XML image composed of fields 302, 304, 306, 310.

In step 510, the receiving component determines the version of the serialized XML image based on the value in the version field 304 of the serialized XML image.

In step 512, it is determined whether the version of the XML image is understood by the receiving component. For example, it is determined whether a version number from field 304 is less than or equal to a maximum version number associated with the database client 112. If so, control passes to step 530 to process the message. If not, the receiving component may not be able to understand or use the serialized XML image and control passes to step 520 to handle this error.

In step 520 the error is handled. For example, in some embodiments an error message is sent to the user. In some embodiments, a request is sent to the sending component to resend the XML data in a different version of the serialization image.

In step 530, the particular serialization format used in the serialized XML image is determined from the flag field 306. For example, the database client determines that the serialized XML image uses the LOB format.

In step 540, the XML data is extracted based on the payload and the particular serialization format. For example, database client 112 extracts the LOB locator, e.g., "0x0000303030303030 . . . ", of a particular PERF element based on the LOB format, indicated in flag field 306, and the contents of the payload field 310.

The method 500 allows the receiving component to receive serialized XML data in any of multiple serialization formats for transferring XML data between components of a system that uses a DBMS to store XML data.

Hardware Overview

Figure 6:
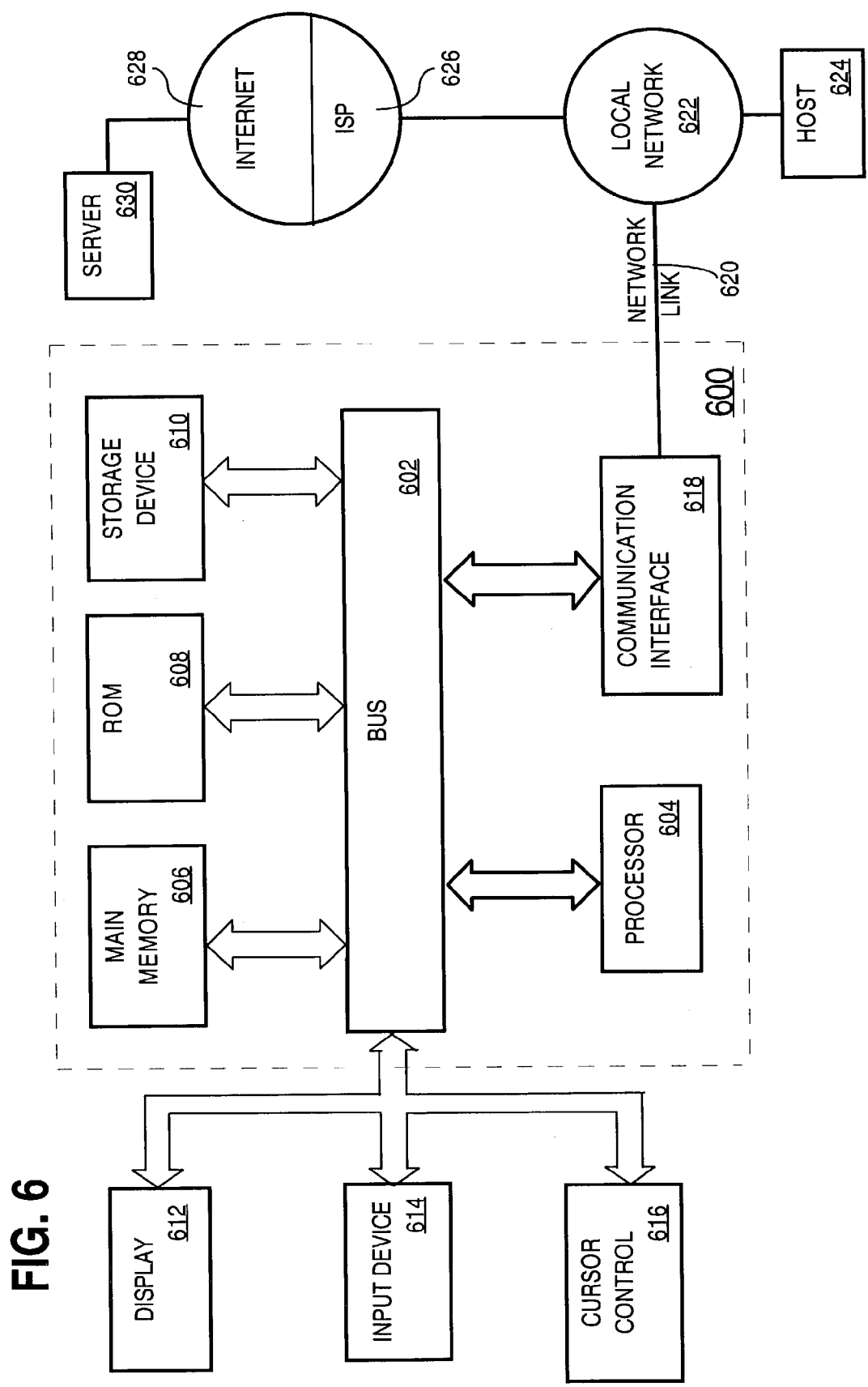
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for transferring a serialized image of data for an eXtensible Markup Language (XML) construct, comprising the computer-implemented steps of:

selecting a first format from a plurality of different XML serialization formats that represent, in a database system, data for XML constructs as a series of bytes;

generating a message that includes
a payload that includes particular serialized data that represents, in the first format, particular data for a particular XML construct; and
a type field that includes data that indicates the first format; and sending the message from a first component of the database system to a different second component of the database system.

2. The method of claim 1, said step of generating the message further comprising generating a message that includes a version field that includes data that indicates a particular form for the type field and the payload.

3. The method of claim 1, said step of generating the message further comprising generating a message that includes a length field that includes data that indicates a number of bytes in the payload.

4. The method of claim 1, wherein the plurality of different XML serialization formats includes at least one of:
   a first format for a locator for a large object in storage shared by the first component and the second component;
   a second format for a reference to an object in the database which can be accessed by the first component and the second component;
   a third format used as a serialized format for objects in the database system;
   a fourth format for a pointer to a memory location in memory shared by the first component and the second component; and
   a fifth format for compressed text.

5. The method of claim 4, said step of generating the message further comprising generating a message that includes:
   a second payload that includes second serialized data that represents, in a second format of the plurality of serialization formats, second data for a second XML construct;
   a second type field that includes data that indicates the second format; and
   a third type field that includes data that indicates a plurality of payloads are included in the message.

6. The method of claim 5, wherein the second format is the same as the first format.

7. The method of claim 5, wherein the second format is different from the first format.

8. The method of claim 5, wherein the second XML construct is the same as the first XML construct.

9. The method of claim 5, wherein the second XML construct is different from the first XML construct.

10. The method of claim 1, said step of generating the message further comprises:
    including, in the payload, optional information used by the first format for the particular XML construct; and
    including, in the type field, options data that indicates the optional information included in the payload.

11. The method of claim 10, wherein the options data indicates that the optional information indicates at least one of:
    a character set for an XML construct;
    a snapshot that indicates a particular state of a database in the database system; and
    a mapping between XML constructs and object-relational constructs in the database system.

12. The method of claim 1, wherein:
    the method further comprises determining a set of preferences at the second component for one or more formats of the plurality of different XML serialization formats; and
    said step of selecting the first format further comprises selecting the first format based on the set of preferences.

13. The method of claim 12, said step of selecting the first format based on the set of preferences further comprising determining whether the first format is included in the set of preferences.

14. The method of claim 12, said step of selecting the first format based on the set of preferences further comprising the steps of:
    determining a second format of the plurality of serialization formats, which second format is generated by the first component;
    determining whether the second format is included in the set of preferences; and
    if it is determined that the second format is included in the set of preferences, then selecting the second format as the first format.

15. The method of claim 14, wherein:
    said step of selecting the first format based on the set of preferences further comprising, if it is determined that the second format is not included in the set of preferences, then performing the step of selecting the first format from the set of preferences; and
    said step of generating the message further comprises converting the particular data from the second format to the first format.

16. The method of claim 1, wherein:
    the method further comprises determining a version that indicates a particular form for the type field and the payload understood at the second component; and
    said step of selecting the first format further comprises selecting the first format based on the version.

17. The method of claim 1, wherein:
    the method further comprises
    receiving a query to generate the particular data for the particular XML construct, and
    evaluating the query; and
    said step of evaluating the query includes generating the particular serialized data in the first format.

18. A method for transferring a serialized image of data for an eXtensible Markup Language (XML) construct, comprising the computer-implemented steps of:
    receiving, at a receiving component of a database system, a message that includes
    a type field that includes data that indicates a first format of a plurality of different XML serialization formats that represent, in a database system, data for XML constructs as a series of bytes, and
    a payload that includes particular serialized data that represents, in the first format, particular data for a particular XML construct; and
    extracting the particular data based on the payload and the first format.

19. The method of claim 18, wherein:
    said step of receiving the message further comprises receiving a version that indicates a particular form for the type field and the payload; and
    the method further comprises the step of determining whether the version indicates that the particular form for the type field and the payload is understood at the receiving component; and
    said step of extracting the particular data is performed only if it is determined that the version indicates that the particular form for the type field and the payload is understood at the receiving component.

20. The method of claim 18, the method further comprises the step of sending, to a database server for use by a sending component that sends the message, a capabilities list that includes data that indicates a subset of the plurality of different XML serialization formats that the receiving component understands.

21. The method of claim 18, the method further comprises the step of sending, to a database server for use by a sending component that sends the message, a preferences list that includes data that indicates a subset of the plurality of different XML serialization formats that the receiving component understands and data that associates with each format in the subset a value that indicates a preference for that format by the receiving component relative to a different format of the plurality of different XML serialization formats.

22. A computer-readable medium carrying one or more sequences of instructions for transferring a serialized image of data for an eXtensible Markup Language (XML) construct, wherein execution of the one or more sequences of instructions by one or more processors causes the one or more processors to perform the steps of:

selecting a first format from a plurality of different XML serialization formats that represent, in a database system, data for XML constructs as a series of bytes;
generating a message that includes
a payload that includes particular serialized data that represents, in the first format, particular data for a particular XML construct; and
a type field that includes data that indicates the first format; and
sending the message from a first component of the database system to a different second component of the database system.

23. A computer-readable medium carrying one or more sequences of instructions for transferring a serialized image of data for an eXtensible Markup Language (XML) construct, wherein execution of the one or more sequences of instructions by one or more processors causes the one or more processors to perform the steps of:

receiving at a receiving component of a database system
a message that includes
a type field that includes data that indicates a first format of a plurality of different XML serialization formats that represent, in a database system, data for XML constructs as a series of bytes, and
a payload that includes particular serialized data that represents, in the first format, particular data for a particular XML construct; and
extracting the particular data based on the payload and the first format.

24. A method for transporting XML information, the method comprising the computer-implemented steps of:
at a first component of a certain database system, converting the XML information that conforms to an XML schema known by the database system to a serialized format that represents the XML information as a series of bytes;
storing the XML information in the serialized format in a first payload of a package;
storing, in the package, information that indicates how to interpret the payload; and
sending said package to a second component.

25. The method of claim 24, wherein said database system maps said XML schema to one or more object relational structures used to store the XML information.

26. The method of claim 24, wherein the serialized format is one of the following:
a format for a locator for a large object in storage;
a format for a reference to an object in a database which can be accessed by the first component and the second component;
a format used as a serialized format for objects in a database managed by the database system; and
a format for a pointer to a memory location in a memory shared by the first component and the second component.

27. The method of claim 24, wherein the information that indicates how to interpret the payload includes information that indicates the XML schema.

28. The method of claim 24 wherein:
the information that indicates how to interpret the payload includes one or more flags; and
the one or more flags are set to a value that indicates a characteristic of the payload.

29. The method of claim 28, further comprising the steps of:
the second component inspecting the one or more flags; and
based on the values of the one or more flags, converting the payload of the package to XML information stored in an object-relational structure that a database system that includes the second component maps to an XML schema.

30. The method of claim 29, wherein the database system of the first component is the same as the database system that includes the second component.

31. The method of claim 30, the steps further including selecting the serialization format from a plurality of serialization formats that include the serialization format.

32. The method of claim 31, wherein the plurality of formats include at least one of:
a format for a locator for a large object in storage;
a format for a reference to an object in a database which can be accessed by the first component and the second component;
a format used as a serialized format for objects in a database managed by the database system; and
a format for a pointer to a memory location in a memory shared by the first component and the second component.

33. The method of claim 24, the steps further including:
converting other XML information to a serialized format that represents the other XML information as a series of bytes;
storing in a second payload of the package the other XML information in the serialized format that represents the other XML information as a series of bytes; and
storing in a field of the package a value that indicates a plurality of payloads are included in the package.

* * * * *